US012811189B2

(12) United States Patent
Jang et al.

(10) Patent No.: US 12,811,189 B2
(45) Date of Patent: Nov. 24, 2026

(54) LITHIUM METAL HALIDE BASED SOLID ELECTROLYTE FOR ALL-SOLID-STATE BATTERY WITH EXCELLENT LITHIUM ION CONDUCTIVITY

(71) Applicants: HYUNDAI MOTOR COMPANY, Seoul (KR); KIA CORPORATION, Seoul (KR); Industry-University Cooperation Foundation Hanyang University ERICA Campus, Ansan-si (KR)

(72) Inventors: Yong Jun Jang, Seongnam-si (KR); Sang Heon Lee, Yongin-si (KR); Sang Soo Lee, Goyang-si (KR); So Young Kim, Jeongeup-si (KR); Seong Hyeon Choi, Changwon-si (KR); Sun Ho Choi, Incheon (KR); Dae Yeon Hwang, Hwaseong-si (KR); Mun Seok Chae, Busan (KR); Ho Cheol Shin, Busan (KR); Kwang Jin Kim, Seoul (KR); Sa Heum Kim, Suwon-si (KR); In Woo Song, Gwacheon-si (KR); Sang Uck Lee, Bucheon-si (KR); Byeong Sun Jun, Suwon-si (KR); Ji Hoon Kim, Ansan-si (KR)

(73) Assignees: Hyundai Motor Company, Seoul (KR); Kia Corporation, Seoul (KR); Industry-University Cooperation Foundation Hanyang University ERICA Campus, Ansan-si (KR)

( * ) Notice: Subject to any disclaimer, the term of this patent is extended or adjusted under 35 U.S.C. 154(b) by 876 days.

(21) Appl. No.: 18/071,810

(22) Filed: Nov. 30, 2022

(65) Prior Publication Data

US 2023/0178798 A1 Jun. 8, 2023

(30) Foreign Application Priority Data

Dec. 7, 2021 (KR) ........................ 10-2021-0173991

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
CPC .................... H01M 10/0562; H01M 2300/008
See application file for complete search history.

(56) References Cited

U.S. PATENT DOCUMENTS 11,888,111 B2 1/2024 Sakai et al.
2021/0098823 A1* 4/2021 Sakai .................. C01G 25/006
2022/0045357 A1* 2/2022 Ouspenski .......... H01M 10/052

FOREIGN PATENT DOCUMENTS

CN 112062154 A 12/2020
KR 10-2021-0131726 A 11/2021
WO 2019145912 A1 8/2019

OTHER PUBLICATIONS

Dronskowski, Richard. Computational Chemistry of Solid State Materials. Weinheim, Germany: Wiley-VCH Verlag GmbH & Co. KGaA, 2005. pp. 13-16 (Year: 2005).*

* cited by examiner

*Primary Examiner* — Barbara L Gilliam
*Assistant Examiner* — Benjamin T Lustgraaf
(74) *Attorney, Agent, or Firm* — Morgan Lewis & Bockius LLP

(57) ABSTRACT

A lithium metal halide-based solid electrolyte for an all-solid-state battery with excellent lithium ion conductivity, includes a compound represented by the following Chemical Formula 1.

$$Li_{6-a}(M1_{1-b}M2_{b})X_6 \quad \text{[Chemical Formula 1]}$$

wherein M1 comprises a group 3 element, a group 4 element or a group 13 element, M2 comprises silicon (Si), germanium (Ge), tin (Sn) or lead (Pb), X comprises chlorine (Cl), bromine (Br) or iodine (I), $0 \le b \le 1$, and a is a number satisfying the following Mathematical Formula 1.

$$a = (\text{oxidation number of } M1 \times (1-b)) + (\text{oxidation number of } M2 \times b) \quad \text{[Mathematical Formula 1]}$$

6 Claims, 1 Drawing Sheet

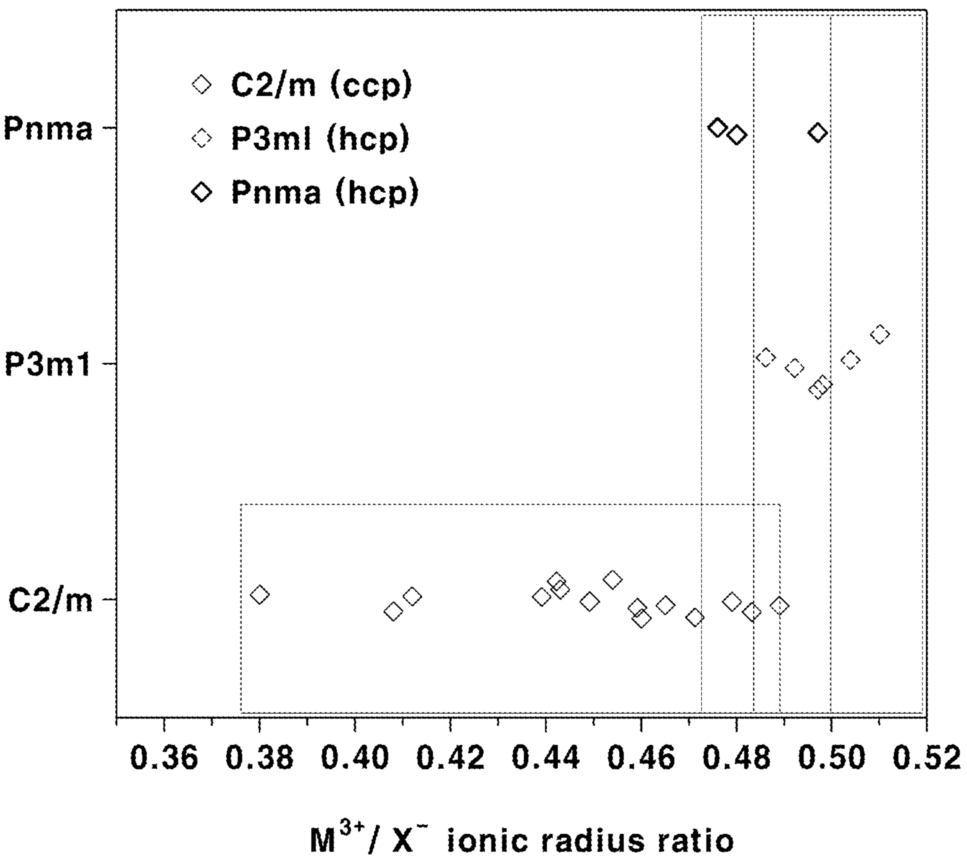
C2/m (ccp)
P3ml (hcp)
Pnma (hcp)
Pnma
P3m1
C2/m
0.36
0.38
0.40
0.42
0.44
0.46
0.48
0.50
0.52
M3+/ X- ionic radius ratio

LITHIUM METAL HALIDE BASED SOLID ELECTROLYTE FOR ALL-SOLID-STATE BATTERY WITH EXCELLENT LITHIUM ION CONDUCTIVITY

CROSS-REFERENCE TO RELATED APPLICATION

The present application claims priority to Korean Patent Application No. 10-2021-0173991 filed on Dec. 7, 2021, the entire contents of which is incorporated herein for all purposes by this reference.

BACKGROUND OF THE PRESENT DISCLOSURE

Field of the Present Disclosure

The present disclosure relates to a lithium metal halide-based solid electrolyte for an all-solid-state battery with excellent lithium ion conductivity.

Description of Related Art

Secondary batteries today are widely used from large devices such as automobiles and power storage systems to small devices such as mobile phones, camcorders and notebook computers.

As the field of applications of secondary batteries expands, there have been growing demands for enhancing safety and performance of the batteries.

A lithium secondary battery, one of secondary batteries, has advantages of having higher energy density and larger capacity per unit area compared to a nickel-manganese battery or a nickel-cadmium battery.

However, an electrolyte used in a conventional lithium secondary battery has been mostly a liquid electrolyte such as an organic solvent. Therefore, safety issues such as electrolyte leakage and the risk of fire caused therefrom have been constantly raised.

Accordingly, interests in an all-solid-state battery using a solid electrolyte instead of a liquid electrolyte in order to increase safety of a lithium secondary battery have recently increased.

A solid electrolyte has nonflammable or flame retardant properties, and therefore, is safer compared to a liquid electrolyte. In addition, the solid electrolyte is capable of being prepared in a bipolar structure, and has an advantage of increasing volume energy density by about 5 times compared to a conventional lithium ion battery.

A solid electrolyte is divided into an oxide-based solid electrolyte and a sulfide-based solid electrolyte. Since the sulfide-based solid electrolyte has higher lithium ion conductivity compared to the oxide-based solid electrolyte and is stable over a wide voltage range, the sulfide-based solid electrolyte is mostly used.

However, the sulfide-based solid electrolyte has very low electrochemical stability and causes a side reaction with an electrode, causing cell deterioration. In addition, the sulfide-based solid electrolyte has poor atmospheric stability and the like, and has significantly decreased lithium ion conductivity when actually used.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a lithium metal halide-based solid electrolyte for an all-solid-state battery with excellent lithium ion conductivity.

The object of the present disclosure is not limited to the object mentioned above.

The object of the present disclosure will become clearer from the following description, and will be realized by means and combinations thereof described in the claims.

A solid electrolyte according to an exemplary embodiment of the present disclosure may comprise a compound represented by the following Chemical Formula 1.

$Li_{6-a}(M1_{1-b}M2_b)X_6$ [Chemical Formula 1]

wherein

M1 comprises a group 3 element, a group 4 element or a group 13 element,

M2 comprises silicon (Si), germanium (Ge), tin (Sn) or lead (Pb),

X comprises chlorine (Cl), bromine (Br) or iodine (I), $0 \le b \le 1$, and a is a number satisfying the following Mathematical Formula 1.

$a$=(oxidation number of $M1\times(1-b)$)+(oxidation number of $M2\times b$) [Mathematical Formula 1]

An ion size ratio of the compound may satisfy the following Condition 1.

$r(M1_{1-b}M2_b)^{a+}/r_{X^-}<0.47$ [Condition 1]

wherein $r(M1_{1-b}M2_b)^{a+}$ is an ion size of $(M1_{1-b}M2)^{a+}$; and $r_{X^-}$ is an ion size of $X^-$.

The solid electrolyte may have a crystal structure belonging to a space group of C2/m.

The solid electrolyte may comprise a compound represented by the following Chemical Formula 2.

$Li_{6-a}(Al_{1-b}Sn_b)Cl_6$ [Chemical Formula 2]

wherein 2, $0 \le b \le 1$, and $3 \le a \le 4$.

The solid electrolyte may comprise a compound represented by the following Chemical Formula 3.

$Li_2(Zr_{1-b}Sn_b)Cl_6$ [Chemical Formula 3]

wherein $0 \le b \le 1$.

The solid electrolyte may comprise a compound represented by the following Chemical Formula 4.

$Li_2(Ti_{1-b}Sn_b)Cl_6$ [Chemical Formula 4]

wherein $0 \le b \le 1$.

A lithium metal halide-based solid electrolyte for an all-solid-state battery with excellent lithium ion conductivity can be obtained according to an exemplary embodiment of the present disclosure.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 shows a result of analyzing a crystal structure determined by an ion size ratio of a metal element and a halogen element of a lithium metal halide-based solid electrolyte represented by $Li_3MX_6$ (M is a metal element having an oxidation number of 3).

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments, it will be understood that the present description is not intended to limit the present disclosure(s) to those exemplary embodiments. On the contrary, the present disclosure(s) is/are intended to cover not only the exemplary embodiments, but also various alternatives, modifications, equivalents and other embodiments, which may be included within the spirit and scope of the present disclosure as defined by the appended claims.

The above objects, other objects, features and advantages of the present disclosure will be easily understood through the following exemplary embodiments related to the accompanying drawings. However, the present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

The similar reference numerals have been used for similar elements while explaining each drawing. In the accompanying drawings, the dimensions of the structures are illustrated after being enlarged than the actual dimensions for clarity of the present disclosure. Terms such as first, second, etc. may be used to describe various components, but the components should not be limited by the terms. The terms are used only for the purpose of distinguishing one component from another component. For example, a first component may be referred to as a second component, and similarly, the second component may also be referred to as the first component, without departing from the scope of rights of the present disclosure. The singular expression includes the plural expression unless the context clearly dictates otherwise.

In the present specification, terms such as "comprise" or "have" are intended to designate that a feature, number, step, operation, component, part, or combinations thereof described in the specification exists, but it should be understood that the terms do not preclude the possibility of the existence or addition of one or more other features, numbers, steps, operations, components, parts, or combinations thereof. Furthermore, when a part of a layer, film, region, plate, etc. is said to be "on" another part, this includes not only the case where it is "directly on" the another part but also the case where there is yet another part therebetween. Conversely, when a part of a layer, film, region, plate, etc. is said to be "under" another part, this includes not only the case where it is "directly under" the another part, but also the case where there is yet another part therebetween.

Unless otherwise specified, all numbers, values, and/or expressions expressing quantities of components, reaction conditions, polymer compositions and formulations used in the present specification are approximate values obtained by reflecting various uncertainties of the measurement that arise in obtaining these values among others in which these numbers are essentially different. Therefore, they should be understood as being modified by the term "about" in all cases. Furthermore, when a numerical range is disclosed in this description, such a range is continuous, and includes all values from a minimum value of such a range to a maximum value including the maximum value, unless otherwise indicated. Furthermore, when such a range refers to an integer, such a range includes all integers including from a minimum value to a maximum value including the maximum value, unless otherwise indicated.

A lithium metal halide-based solid electrolyte includes a lithium element, a metal element (M) and a halogen element, and as the metal element (M), metals, semimetals and the like having an oxidation number of divalent, trivalent or tetravalent are mainly used.

Among these, $Li_3MX_6$, a lithium metal halide-based solid electrolyte including a metal element (M) having an oxidation number of trivalent, has three crystal structures belonging to space groups of C2/m, P-3 ml and Pnma. The lithium metal halide-based solid electrolyte shows high lithium ion conductivity when having a crystal structure belonging to a space group of C2/m. On the other hand, the lithium metal halide-based solid electrolyte having a crystal structure belonging to a space group of P-3 ml shows a decrease in the lithium ion conductivity caused by an anti-site defect.

An object of the present disclosure is to provide a novel lithium metal halide-based solid electrolyte having a crystal structure belonging to a space group of C2/m.

The lithium metal halide-based solid electrolyte according to an exemplary embodiment of the present disclosure may include a compound represented by the following Chemical Formula 1.

$$Li_{6-a}(M1_{1-b}M2_b)X_6 \quad \text{[Chemical Formula 1]}$$

In Chemical Formula 1, M1 may comprise a group 3 element, a group 4 element or a group 13 element, M2 may comprise silicon (Si), germanium (Ge), tin (Sn) or lead (Pb), and X may comprise chlorine (Cl), bromine (Br) or iodine (I).

In addition, $0 \le b \le 1$, and a may be a number satisfying the following Mathematical Formula 1.

$$a = (\text{oxidation number of } M1 \times (1-b)) + (\text{oxidation number of } M2 \times b) \quad \text{[Mathematical Formula 1]}$$

The group 3 element may comprise at least one of scandium (Sc), yttrium (Y) or any combination thereof.

The group 4 element may comprise at least one of titanium (Ti), zirconium (Zr), Hafnium (Hf), rutherfordium (Rf) or any combination thereof.

The group 13 element may comprise at least one of boron (B), aluminium (Al), gallium (Ga), indium (In), thallium (Tl), nihonium (Nh) or any combination thereof.

It is a technical feature of the present disclosure that, by properly combining M1 and M2 and thereby having an ion size ratio of the compound satisfying the following Condition 1, the lithium metal halide-based solid electrolyte has a crystal structure belonging to a space group of C2/m.

$$r(M1_{1-b}M2_b)^{a+}/r_{X^-} < 0.47 \quad \text{[Condition 1]}$$

wherein $r(M1_{1-b}M2_b)^{a+}$ is an ion size of $(M1_{1-b}M2_b)^{a+}$; and $r_{X^-}$ is an ion size of $X^-$.

Herein, the ion size means a size of the corresponding element present in an ion state in the crystal structure of the compound.

FIG. 1 shows a result of analyzing a crystal structure determined by an ion size ratio of a metal element and a halogen element of a lithium metal halide-based solid electrolyte represented by $Li_3MX_6$ (M is a metal element having an oxidation number of 3). As a result of analyzing various composition-dependent crystal structures of the lithium metal halide-based solid electrolyte as in FIG. 1, the inventors of the present disclosure have found out that three crystal structures belonging to the above-described space groups of C2/m, P-3 ml and Pnma are determined depending on the ion size ratio of the metal element and the halogen element, and have completed the present disclosure based thereon.

The ion size ratio of the metal element and the halogen element may be lowered by substituting a metal element having an oxidation number of 3 with a metal element having an oxidation number of 4 with a smaller size. Accordingly, the lithium metal halide-based solid electrolyte may satisfy the above-mentioned Condition 1 when combining metal elements having an oxidation number of 4, or substituting a metal element having an oxidation number of 3 with a metal element having an oxidation number of 4.

In addition, substituting with a metal element having an oxidation number of 4 increases bonding strength between the metal element and the halogen element, suppressing formation of an anti-site defect.

The lithium metal halide-based solid electrolyte according to an exemplary embodiment of the present disclosure may include a compound represented by the following Chemical Formula 2.

$$Li_{6-a}(Al_{1-b}Sn_b)Cl_6 \quad \text{[Chemical Formula 2]}$$

In Chemical Formula 2, $0 \le b \le 1$, and $3 \le a \le 4$.

Herein, a may be a number satisfying the following Mathematical Formula 2.

$$a = (\text{oxidation number of aluminum} \times (1-b)) + (\text{oxidation number of } tin \times b) \quad \text{[Mathematical Formula 2]}$$

The lithium metal halide-based solid electrolyte according to an exemplary embodiment of the present disclosure may include a compound represented by the following Chemical Formula 3.

$$Li_2(Zr_{1-b}Sn_b)Cl_6 \quad \text{[Chemical Formula 3]}$$

In Chemical Formula 3, $0 \le b \le 1$.

The lithium metal halide-based solid electrolyte according to an exemplary embodiment of the present disclosure may include a compound represented by the following Chemical Formula 4.

$$Li_2(Ti_{1-b}Sn_b)Cl_6 \quad \text{[Chemical Formula 4]}$$

In Chemical Formula 4, $0 \le b \le 1$.

The following Table 1 shows results of calculating anti-site defect forming energies of $Li_3YCl_6$, $Li_2ZrCl_6$ and $Li_2SnCl_6$.

TABLE 1

| Item | $Li_3YCl_6$ | $Li_2ZrCl_6$ | $Li_2SnCl_6$ |
|---|---|---|---|
| Anti-Site Defect Forming Energy [eV] | 1.14 | 1.29 | 1.75 |

When referring to Table 1, the anti-site defect forming energies of $Li_3YCl_6$ and $Li_2ZrCl_6$ are respectively 1.14 eV and 1.29 eV, and the anti-site defect forming energy of $Li_2SnCl_6$ is 1.75 eV, and therefore, it may be relatively difficult for $Li_2SnCl_6$ to form an anti-site defect.

Accordingly, the compounds of Chemical Formula 2 to Chemical Formula 4 including a tin (Sn) element while satisfying the above-mentioned Condition 1 exhibit high lithium ion conductivity through controlling the crystal structure and suppressing the anti-site defect formation.

The following Table 2 and Table 3 show calculation results obtained by simulating lithium ion conductivity of the compound represented by Chemical Formula 2 and the compound represented by Chemical Formula 3, respectively.

TABLE 2

| Composition | Ion Conductivity [mS/cm] | Activation Energy [eV] |
|---|---|---|
| $Li_3AlCl_6$ | 24.46 | 0.21 |
| $Li_{2.67}Al_{0.67}Sn_{0.33}Cl_6$ | 18.07 | 0.22 |
| $Li_{2.33}Al_{0.33}Sn_{0.67}Cl_6$ | 41.77 | 0.19 |
| $Li_2SnCl_6$ | 39.85 | 0.19 |

TABLE 3

| Composition | Ion Conductivity [mS/cm] | Activation Energy [eV] |
|---|---|---|
| $Li_2ZrCl_6$ | 27.05 | 0.20 |
| $Li_2Zr_{0.67}Sn_{0.33}Cl_6$ | 22.26 | 0.20 |
| $Li_2Zr_{0.33}Sn_{0.67}Cl_6$ | 4.67 | 0.26 |
| $Li_2SnCl_6$ | 39.85 | 0.19 |

Hereinabove, Experimental Examples and Examples of the present disclosure have been described in detail. However, the scope of a right of the present disclosure is not limited to the above-described Experimental Examples and Examples, and various changes and modifications made by those skilled in the art using the basic concept of the present disclosure defined in the appended claims also fall within the scope of a right of the present disclosure.

The foregoing descriptions of specific exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents.

What is claimed is:

1. A solid electrolyte comprising a compound represented by the following Chemical Formula 1:

$$Li_{6-a}(M1_{1-b}M2_b)X_6 \quad \text{[Chemical Formula 1]}$$

wherein

M1 is aluminum (Al), zirconium (Zr) or titanium (Ti);

M2 is tin (Sn);

X comprises chlorine (Cl), bromine (Br) or iodine (I);

$0.33 \leq b \leq 1$; and a is a number satisfying the following Mathematical Formula 1:

$$a = (\text{oxidation number of } M\mathbf{1} \times (\mathbf{1} - b)) + (\text{oxidation number of } M\mathbf{2} \times b)$$ [Mathematical Formula 1]

2. The solid electrolyte of claim 1, wherein an ion size ratio of the compound satisfies the following Condition 1:

$$r(M1_{1\text{-}b}M2_b)^{a+}/r_{X^-} < 0.47$$ [Condition 1]

wherein $r(M1_{1\text{-}b}M2_b)^{a+}$ is an ion size of $(M1_{1\text{-}b}M2)^{a+}$; and $r_{X^-}$ is an ion sizeof $X^-$.

3. The solid electrolyte of claim 1, wherein the solid electrolyte has a crystal structure belonging to a space group of C2/m.

4. The solid electrolyte of claim 1, wherein the solid electrolyte comprises a compound represented by the following Chemical Formula 2:

$$Li_{6\text{-}a}(Al_{1\text{-}b}Sn_b)Cl_6$$ [Chemical Formula 2]

wherein $0.33 \leq b \leq 1$; and $3 \leq a \leq 4$.

5. The solid electrolyte of claim 1, wherein the solid electrolyte comprises a compound represented by the following Chemical Formula 3:

$$Li_2(Zr_{1\text{-}b}Sn_b)Cl_6$$ [Chemical Formula 3]

wherein $0.33 < b \leq 1$.

6. The solid electrolyte of claim 1, wherein the solid electrolyte comprises a compound represented by the following Chemical Formula 4:

$$Li_2(Ti_{1\text{-}b}Sn_b)Cl_6$$ [Chemical Formula 4]

wherein $0.33 \leq b \leq 1$.

* * * * *